United States Patent
Arunachalam (10) Patent No.: US 12,265,501 B1
(45) Date of Patent: Apr. 1, 2025

(54) PLANAR FILE SYSTEM FOR ORGANIZING AND INTERRELATING LARGE DATA SETS

(71) Applicant: Hewlett Packard Enterprise Development LP, Spring, TX (US)

(72) Inventor: Somasundaram Arunachalam, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/594,413

(22) Filed: Mar. 4, 2024

(30) Foreign Application Priority Data

Dec. 15, 2023 (IN) .............................. 202341088020

(51) Int. Cl.
*G06F 16/13* (2019.01)
*G06F 16/176* (2019.01)
*G06F 16/18* (2019.01)
*G06F 16/185* (2019.01)

(52) U.S. Cl.
CPC .......... *G06F 16/13* (2019.01); *G06F 16/1774* (2019.01); *G06F 16/185* (2019.01); *G06F 16/1858* (2019.01)

(58) Field of Classification Search
CPC . G06F 16/1774; G06F 16/185; G06F 16/1858
USPC ........................................................ 707/704
See application file for complete search history.

(56) References Cited

U.S. PATENT DOCUMENTS

| | | | | |
|---|---|---|---|---|
| 5,987,477 A | * | 11/1999 | Schmuck | G06F 16/1858 707/999.008 |
| 2005/0055380 A1 | * | 3/2005 | Thompson | G06F 16/20 |
| 2016/0162364 A1 | * | 6/2016 | Mutha | G06F 3/0608 707/645 |
| 2021/0303523 A1 | * | 9/2021 | Periyagaram | G06F 16/13 |

OTHER PUBLICATIONS

The DBOS Committee, "DBOS: A Proposal for a Data-Centric Operating System", Jul. 2020, 20 pages.

\* cited by examiner

*Primary Examiner* — Kuen S Lu
(74) *Attorney, Agent, or Firm* — Slater Matsil, LLP (57) ABSTRACT

In certain embodiments, a computer-implemented method includes: receiving, from a user interface and at a planar file system manager executing on one or more processors, a planar file system configuration request comprising a plurality of planes and a plurality of plane relationships, wherein the plurality of plane relationships comprise a sub-planar relationship between a plane and a sub-plane and an orthogonal relationship between two separate planes of the plurality of planes; configuring, by the planar file system manager, a storage environment to include a planar file system based on the planar file system configuration request; receiving, from the user interface, a plane operation request to perform an operation on a plane of the planar file system, wherein the plane operation request comprises a plane identifier corresponding to the plane; and performing, based on the plane operation request, the operation on the plane.

19 Claims, 8 Drawing Sheets

| Planar File Groups | | File Handle | File Size |
|---|---|---|---|
| Planar ID | Plane Relationship Level | | |
| PL-A1 | 0 | Example.mp4 | 2 GB |
| PL-A10 | 1 | Example1.tiff | 30 GB |
| PL-A10 | 1 | Sample3.jpg | 1 MB |
| PL-A10 | 1 | Collection.zip | 10 GB |
| PL-A101 | 2 | Metadata1.docx | 10 MB |
| PL-A101 | 2 | Features.mov | 7 GB |
| PL-A101 | 2 | Subset.pdf | 4 MB |
| PL-A1:PL-B1 | 1 | ConsolodatedFeatures.mov | 12 GB |

Table 500

```
PL-A – Lifeform Possibility
          ↓
PL-B – Atmospheric Conditions
          ↓
PL-C – Temperature Conditions
          ↓
PL-D – Water Conditions
          ↓
PL-E – Surface Feature Information
```

PLANAR FILE SYSTEM FOR ORGANIZING AND INTERRELATING LARGE DATA SETS

BACKGROUND

As the amount of data being used for a variety of scenarios where the data is stored to be operated on, analyzed, or otherwise used increases by orders of magnitude over time, it may become increasingly difficult to organize the data. As an example, in the context of high performance computing (HPC) storage ecosystems, including, but not limited to, parallel file servers and file systems where large amounts of heterogenous data are generated, techniques for organizing large quantities of heterogeneous data files often requires significant overhead to manage, and may not provide robust techniques for creating logical relationships between the data.

BRIEF DESCRIPTION OF THE DRAWINGS

Certain embodiments discussed herein will be described with reference to the accompanying drawings listed below. However, the accompanying drawings illustrate only certain aspects or implementations of embodiments described herein by way of example, and are not meant to limit the scope of the claims.

DETAILED DESCRIPTION OF ILLUSTRATIVE EMBODIMENTS

As storage, memory, compute, and network input/output (IO) activities become increasingly complex and large-scale for applications of high performance computing, the amount of data being generated, consumed, and/or otherwise used in such scenarios increases exponentially. Such data may increase in both in the number of files and/or the size of such files that include the data. Such data may include large numbers (e.g., billions, trillions, etc.) of heterogeneous files, which may be interrelated in any number of varied and complex ways.

Examples of scenarios where such quantities of files may be used include, but are not limited to: artificial intelligence, machine learning, automated vehicles, space exploration, searching for extraterrestrial life, genetic engineering, deoxyribonucleic acid (DNA) modeling, computational biology, gene modeling, environmental modeling, subatomic level experiments, etc. Such large amounts of data may be accessed by any number of computing devices of any type to perform various types of analysis and/or any other operations.

Data is often stored in some form of hierarchical file system (HFS). Such file systems often include constructs and concepts such as global namespaces, local namespaces, file hierarchies and structures, etc. Other times, data may be stored using an object-based storage scheme, where data is managed as discrete objects, or using block storage, where data is managed as blocks within other data constructs (e.g., sectors, tracks, etc.). However, such concepts may make it difficult to operate on large amounts of related data at the same time, or to organize the data into relevant relationships through file system provisions.

In order to address at least the aforementioned problems with data organization for large amounts of data, embodiments disclosed herein provide techniques for grouping data into planar groups stored in planes, and defining various relationships between the data using relationships between the planes.

In one or more embodiments, a plane, as used herein, refers to a logical storage construct for storing a group of related files. In one or more embodiments, a user may interact with a planar file system manager to define any number of planes for any number of planar file groups. In one or more embodiments, each planar file group is intended to store a related set of files.

In one or more embodiments, a user may also define any number of planar relationships between planes. In one or more embodiments, a plane may have any number of sub-planes. In one or more embodiments, a sub-plane is intended to store a subset of the related files of a planar file group stored in the plane, or files that have a sub-planar relationship, meaning they are related to files in the parent plane, but not necessarily to files in other planes or sub-planes. In one or more embodiments, any number of sub-planes may be configured in a plane. Additionally, sub-planes may also have further sub planes that include a portion of the files of the sub-plane, with any number of nested levels of sub-planes possible.

In one or more embodiments, sub-planes within a plane may be discrete from one another. Additionally, or alternatively, sub-planes within a plane may be orthogonally related to one another, which may mean that there is a logical relationship between the data in the sub-planes, but that the files one sub-plane are not a subset of the files in the other sub-plane. Additionally, planes (e.g., that are not sub-planes) may also be similarly orthogonally related.

In one or more embodiments, a user may also define the size of a plane, sub-plane, etc., define maximum individual file sizes that may exist within a plane, and/or any other relevant parameter related to storage space, file size, etc. of a plane. In one or more embodiments, such configuration details are provided to a planar file system manager.

In one or more embodiments, once the user has provided the configuration details for the planar file system, including the various planes, sub-planes, and relationships, the planar file system manager may prepare any number of storage devices of any type to implement the planar file system as defined by the user. In one or more embodiments, preparing the storage may include generating a table that includes each of the planes, sub-planes, and plane relationships, as well as the location in the one or more storage devices where the planes are to be located. In one or more embodiments, preparing the storage may also include formatting any number of storage devices with the various planes using the various plane sizes specified by the user.

In one or more embodiments, the underlying storage for the planar file system is a parallel file system. In one or more embodiments, a parallel file system is a file system in which file data is striped across any number of homogeneous or heterogeneous storage devices, and that may be concurrently accessed by any number of entities (e.g., computing devices). In one or more embodiments, when the planar file system manager uses a parallel file system as the underlying storage mechanism for the planar file system, the planes defined by the user may be striped across the various storage devices in a similar manner, while also gaining the benefits provided by parallel file systems. Any other types of underlying storage devices and solutions may be used without departing from the scope of embodiments disclosed herein.

In one or more embodiments, planes, sub-planes, etc., as described above, may include data that is related in some way to other data. In one or more embodiments, the planes, sub-planes, etc. may be operated on as a whole, or on a per file basis. As an example, a user may configure any number of parameters (e.g., security, access control, encryption requirements, etc.) to entire planes. Such permissions may flow down to sub-planes. Additionally, sub-planes may have additional parameters defined. As an example, a plane may be configured with access permissions for a certain set of users, but not have required encryption, while a sub-plane within the plane may have the same access permissions (as part of the plane), but have an encryption requirement.

Files in planes and sub-planes may be identified by a file handle (e.g., a file name) and a planar identifier (ID). As an example, a planar ID may be any alpha numeric character set unique to the plane. Thus, a plane may have a plane ID of PL-A, another plane may have a plane ID of PL-B, etc. In one or more embodiments, planar IDs represent relationships between planes and sub-planes. As an example, a plane PL-A may have a sub-plane PL-A1, which may have a sub-sub-plane PL-A1A.

In one or more embodiments, plane IDs may be used to perform operations on planes as a whole, and relationships between planes may be used to perform additional operations. As an example, a user may provide a plane ID as an identifier of the file set that is to be analyzed for any purpose (e.g., to determine if a particular area of the universe has a planetary system that includes a star with certain characteristics), and if the analysis yields a certain result (e.g., the star has the desired characteristics), the analysis may continue to an orthogonally related plane that includes files related to atmospheric conditions on the planets of the planetary system, which will be used to determine if any of the planets have an atmosphere conducive to the planet being able to host life.

Certain embodiments of this disclosure may allow any number of planes and plane relationships to be defined by a user. The planes may be used to store large sets of related data, and the relationships between the planes may be used to define relationships between the data. The planes may be organized into a planar file system, which may be implemented on underlying storage technologies. The planar file system may be accessed by any number of relevant entities. The planar file system may simplify the storage and grouping of large data sets.

Figure 1:
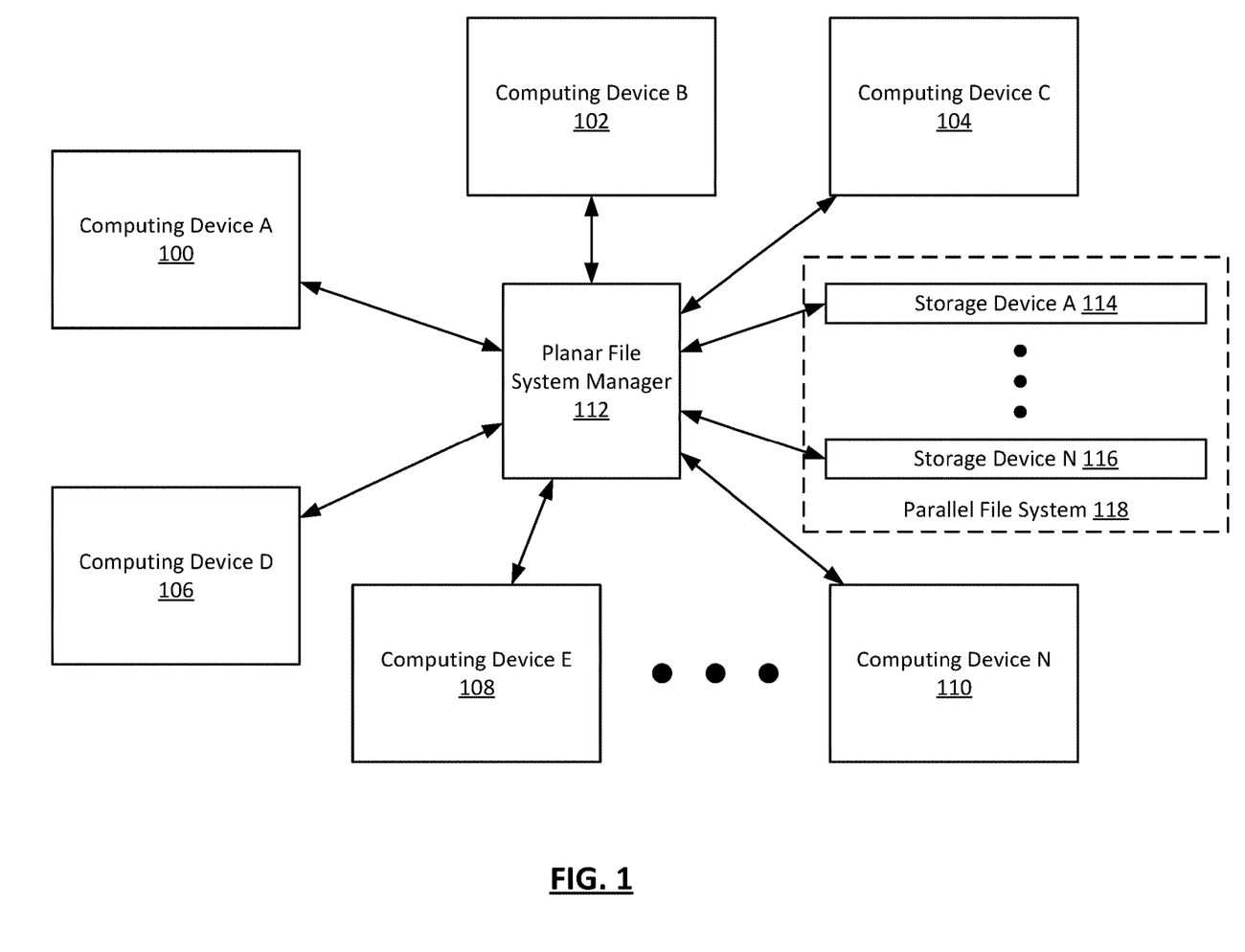
FIG. 1 illustrates a block diagram of an example system for implementing a planar file System for organizing and interrelating large data sets in accordance with or more embodiments of this disclosure.

FIG. 1 illustrates a block diagram of an example system for implementing a planar file System for organizing and interrelating large data sets in accordance with or more embodiments of this disclosure. The system may include any number of computing devices, such as computing device A 100, computing device B 102, computing device C 104, computing device D 106, computing device E 108, and computing device N 110. The computing devices may be operatively connected to a planar file system manager 112. The planar file system manager 112 may be operatively connected to any number of storage devices (e.g., storage device A 114, storage device N 116). The storage devices (114, 116) may optionally be part of a parallel file system 118. Each of these components is described below.

In one or more embodiments, as used herein, a computing device (e.g., 100, 102, 104, 106, 108, 110) may be any single computing device, a set of computing devices, a portion of one or more computing devices, or any other physical, virtual, and/or logical grouping of computing resources. In one or more embodiments, a computing device is any device, portion of a device, or any set of devices capable of electronically processing instructions and may include, but is not limited to, any of the following: one or more processors (e.g. components that include circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), an Internet of Things (IoT) device, an array of nodes of computing resources, a supercomputing device, a data center or any portion thereof, and/or any other type of computing device with the aforementioned requirements. In one or more embodiments, any or all of the aforementioned examples may be combined to create a system of such devices, or may be partitioned into separate logical devices, which may collectively be referred to as a computing device. Other types of computing devices may be used without departing from the scope of embodiments described herein, such as, for example, the computing device shown in FIG. 7 and described below. The system may include any number and/or type of such computing devices in any arrangement and/or configuration without departing from the scope of embodiments disclosed herein.

In one or more embodiments, the storage (not shown) and/or memory (not shown) of a computing device or system of computing devices may be and/or include one or more data repositories for storing any number of data structures storing any amount of data (e.g., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) and/or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods, processes, etc. of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

Although FIG. 1 shows six computing devices, one having ordinary skill in the relevant art, and the benefit of this Detailed Description will appreciate that the system may include any number of computing devices, which the three dots between the computing device E 108 and the computing device N 110 is intended to convey. All or any portion of the computing devices may be the same type, or different types of computing devices.

In one or more embodiments, a computing device (e.g., 100, 102, 104, 106, 108, 110) may be configured to execute any number of processes (not shown). As used herein, a process is any set of operations performed via execution of instructions by a processor of a computing device. A process may execute one or more threads, tasks, etc., generally to achieve a defined result. A process may be all or part of an application. An application may be software designed to perform any function. Examples of applications include, but are not limited to, high performance computing applications, biological gene modeling applications, real-world simulations, sampling of astronomical data, autonomous vehicle control, financial modeling, predictive analysis, machine learning/artificial intelligence applications, etc. A process may be part of a distributed application. In one or more embodiments, a distributed application is an application in which processes may execute on separate computing devices and/or separate processors. As an example, a distributed application may include processes executing on separate computing devices in different physical locations (e.g., in separate data centers). As another example, a distributed application may execute processes on separate processors, which may be part of the same computing device and/or separate computing devices. In one or more embodiments, a process executes to generate or otherwise obtain one or more results. In some cases, the result obtained by a process may be an intermediate result. In one or more embodiments, an intermediate result is any result obtained by a process that is to be used by another process. As an example, a process of a distributed application executing on one computing device may execute to obtain an intermediate result, and the intermediate result may be provided to another process of the distributed application executing on another computing device to be used for further execution of the application.

In one or more embodiments, any one or more computing devices (e.g., 100, 102, 104, 106, 108, 110) shown in FIG. 1 may be configured to perform different operations, analyses, objectives, etc. In one or more embodiments, any one or more of the computing devices (e.g., 100, 102, 104, 106, 108, 110) may be configured to perform such analyses, operations, etc. using or otherwise based on large amounts of data (e.g., terabytes, petabytes, exabytes, zettabytes, etc.). Such large amounts of data may exist as a corresponding large number of files (e.g., tens of thousands of hundred gigabyte or more audio/video files and/or several different types of other heterogeneous files with varying sizes). Examples of scenarios where computing devices (e.g., 100, 102, 104, 106, 108, 110) may be configured to execute using such large quantities of files include, but are not limited to: artificial intelligence, machine learning, automated vehicles, space exploration, searching for extraterrestrial life, genetic engineering, DNA modeling, computational biology, gene modelling, environmental modelling, sub-atomic level experiments, weather modeling, etc.

In one or more embodiments, in order to store and access large data sets, the computing devices (e.g., 100, 102, 104, 106, 108, 110) may be operatively connected to the planar file system manager 112. In one or more embodiments, the planar file system manager is a computing device of any type (discussed above). In one or more embodiments, the planar file system manager is configured to implement and manage one or more planar file systems. In one or more embodiments, a planar file system is a technique for organizing files by grouping data into groups of related files, stored in planes, and defining various relationships between the data using relationships between the planes.

In one or more embodiments, a plane, as used herein, refers to a logical storage construct for storing a group of related files. In one or more embodiments, a user may interact with a planar file system manager 112 to define any number of planes for any number of planar file groups. In one or more embodiments, each plane is intended to store a related set of files. In one or more embodiments, a user may interact with the planar file system manager 112 using any suitable technique for interacting with a computing device, such as via one or more of the computing devices (e.g., 100, 102, 104, 106, 108, 110), by accessing a user interface over a network, etc.

In one or more embodiments, a user may also interact with the planar file system manager 112 to define any number of planar relationships between planes. In one or more embodiments, planes may have a nested relationship, be discrete sub-planes, and/or be orthogonally related to other planes.

In one or more embodiments, nested plane relationships are when planes have sub-planes. In one or more embodiments, a plane may have any number of sub-planes. In one or more embodiments, a sub-plane is intended to store a subset of the related files of a planar file group stored in the plane that have some additional level of interrelatedness relative to the parent plane of the sub-plane. In one or more embodiments, any number of sub-planes may be configured in a plane. Additionally, sub-planes may also have further sub planes that include a portion of the files of the sub-plane, thereby creating a nested relationship of any number of planes.

In one or more embodiments, sub-planes may be discrete from one another, meaning they are related insofar as they are sub-planes of the same parent plane, but not in a nested relationship with one another.

In one or more embodiments, planes, or sub-planes, may be orthogonally related to one another, which may mean that the files of the planes, or sub-planes, are logically related in some way, but that the files of one orthogonally related plane or sub-plane are not a subset of the files of the other orthogonally related plane or sub-plane.

In one or more embodiments, in addition to defining a quantity of planes for a planar file system, and relationships between the planes, a user may also define the size of a plane, sub-plane, etc., define maximum individual file sizes that may exist within a plane, and/or any other relevant parameter related to storage space, file size, etc. of a plane. A user may also define planar locks for facilitating concurrent access, various provisions in data structures for planar privileges, planar security attributes, etc.

In one or more embodiments, once a user has provided the configuration details for the planar file system, including the various planes, sub-planes, and relationships, the planar file system manager 112 may prepare any number of storage devices of any type to implement the planar file system as defined by the user. In one or more embodiments, preparing the storage may include generating a data structure that includes each of the planes, sub-planes, and plane relationships, as well as the location in the one or more storage devices where the planes are to be located. In one or more embodiments, preparing the storage may also include formatting any number of storage devices with the various planes using the various plane sizes specified by the user.

Figure 5A:
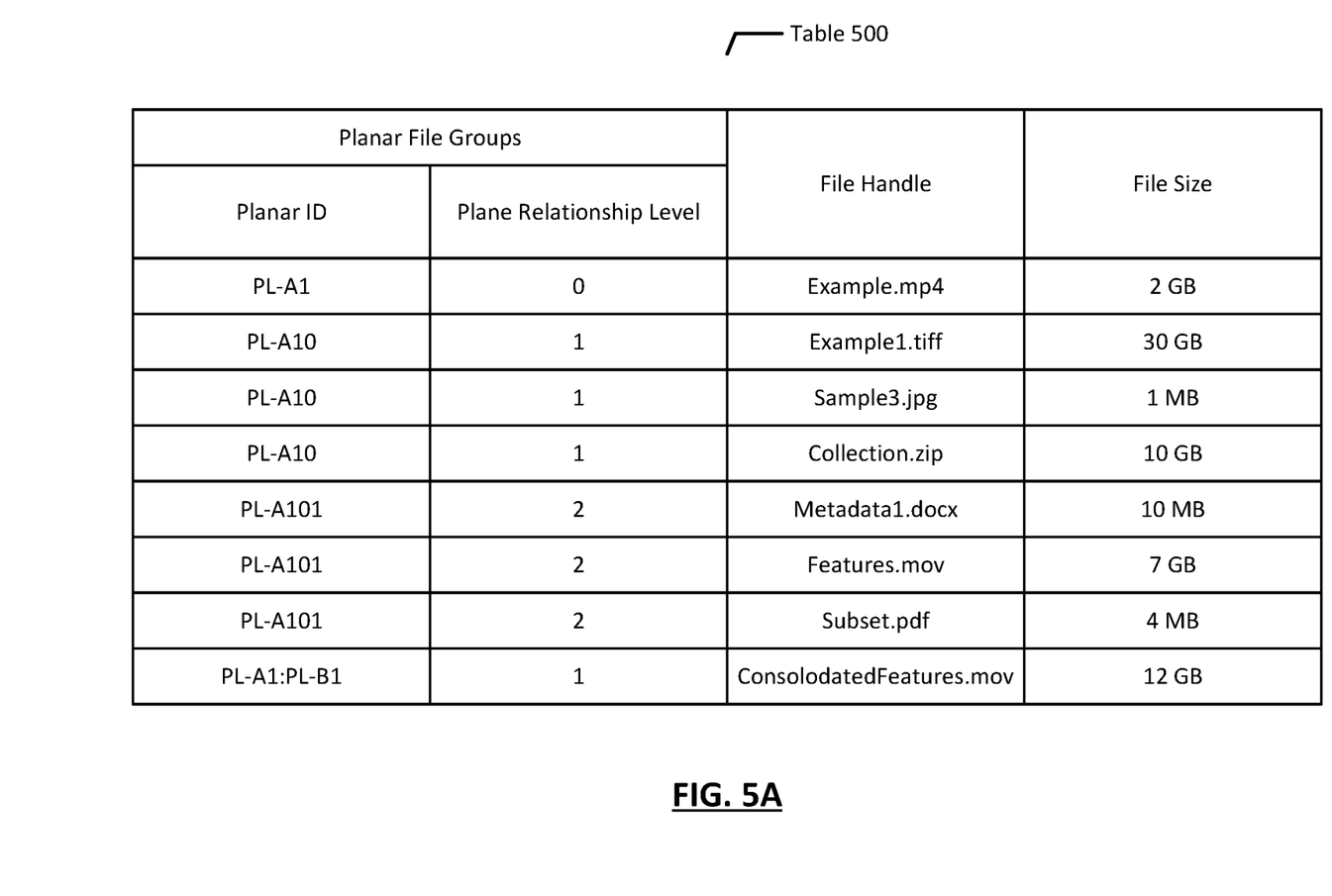
FIG. 5A shows an example planar file system lookup table 500 in accordance with one or more embodiments disclosed herein.
Figure 5B:
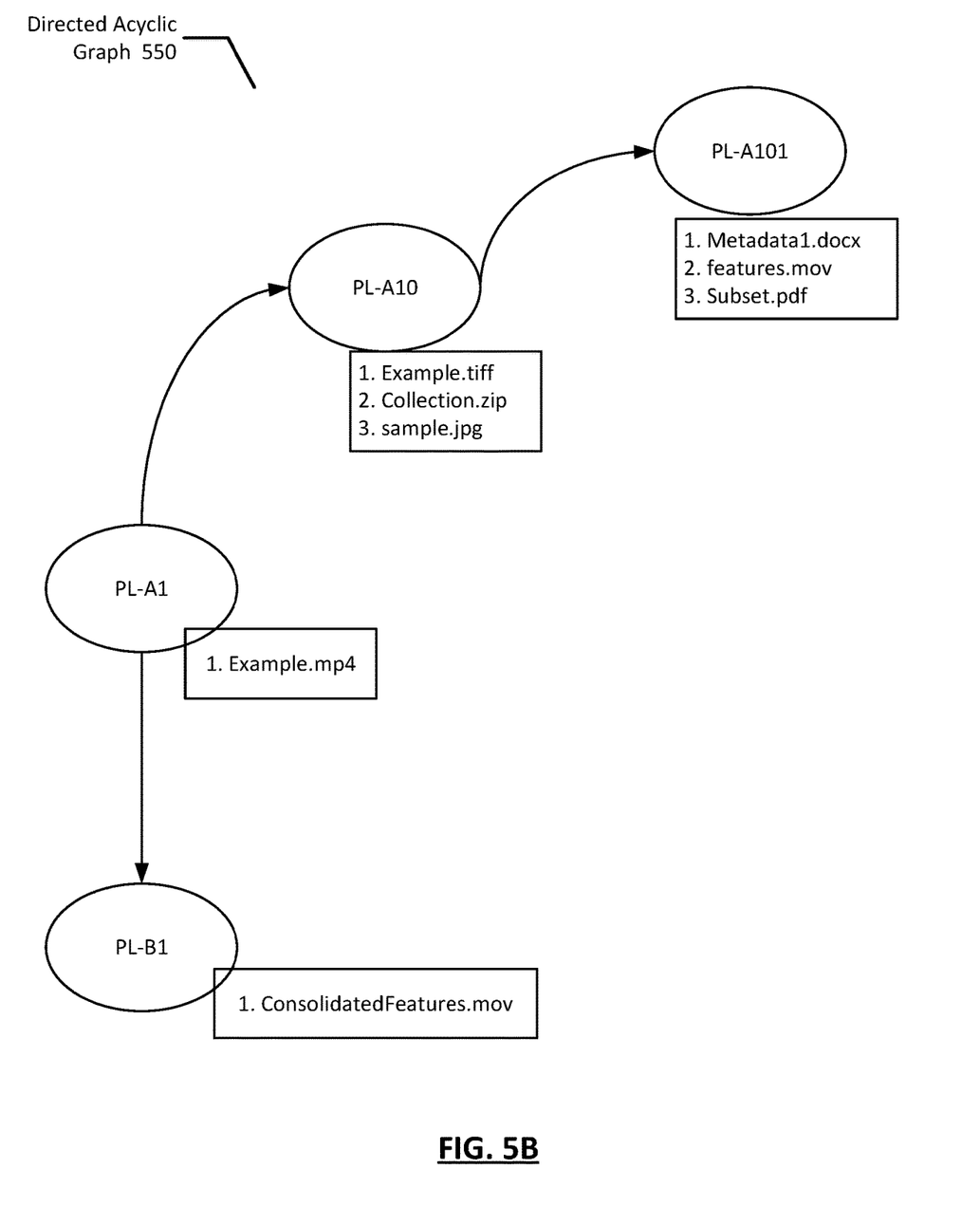
FIG. 5B shows an example of a planar file system lookup directed acyclic graph in accordance with one or more embodiments disclosed herein.

In one or more embodiments, the planar file system manager may prepare any number of data structures for performing lookups of files or groups of files on the planar file system. In one or more embodiments, lookups of files or groups of files may be performed based at least in part on a planar identifier (ID) and/or a file handle. Files in planes and sub-planes may be identified by a file handle (e.g., a file name) and a planar ID. As an example, a planar ID may be any alpha numeric character set unique to the plane. Thus, a plane may have a plane ID of PL-A, another plane may have a plane ID of PL-B, etc. In one or more embodiments, planar IDs represent relationships between planes and sub-planes. As an example, a plane PL-A may have a sub-plane PL-A1, which may have a sub-sub-plane PL-A1A, and PL-A may be orthogonally related to a plane having a planar ID of PL-B. In one or more embodiments, in the context of discrete planes and/or orthogonally related planes, a planar namespace defined by planar identifiers may facilitate the use of the same file handles in the different planes. In one or more embodiments, data structures that may be used to perform lookups of data in a planar file system include, but are not limited to, tables (e.g., as shown in FIG. 5A), directed acyclic graphs (DAGs) (e.g., as shown in FIG. 5B), nested sparse matrices-based plane indices, etc.

In one or more embodiments, planes, sub-planes, etc., as described above, may include related data. In one or more embodiments, the planes, sub-planes, etc. may be operated on as a whole (e.g., using a planar ID), or on a per file basis (e.g., using a planar ID and file handle). As an example, a user may configure any number of parameters (e.g., security, access control, encryption requirements, etc.) for entire planes. Such permissions may flow down to sub-planes. Additionally, sub-planes may have additional parameters defined. As an example, a plane may be configured with access permissions for a certain set of users, but not have required encryption, while a sub-plane within the plane may have the same access permissions (as part of the plane), but have an additional encryption requirement.

In one or more embodiments, planar IDs may be used to perform operations on planes as a whole, and relationships between planes may be used to perform additional operations. As an example, a user may provide a planar ID as an identifier of the file set that is to be analyzed for any purpose (e.g., to determine if a particular area of the universe has a planetary system that includes a star with certain characteristics), and if the analysis yields a certain result (e.g., the star has the desired characteristics), the analysis may continue to an orthogonally related plane that includes files related to atmospheric conditions on the planets of the planetary system, which will be used to determine if any of the planets have an atmosphere conducive to the planet being able to host life.

In one or more embodiments, the planar file system manager 112 may configure any number of planar file systems, and each such planar file system may be configured for and/or otherwise accessible to any number of computing devices (e.g., 100, 102, 104, 106, 108, 110). As an example, a planar file system that stores a particular type of data may be made accessible to any number of separate computing devices, which may use the data in different ways, to perform different types of analysis, etc. In one or more embodiments, planes and/or files stored therein may be operated on by users of computing devices providing commands that include the planar IDs and/or file handles of the files in the planar file system to the planar file system manager 112.

In one or more embodiments, the planar file system manager 112, based at least in part on configuration details received from one or more users, configures a planar file system using any number of storage devices (e.g., the storage device A 114, the storage device N 116) of any type using any type of storage techniques, paradigms, etc. Although FIG. 1 shows two storage devices (114, 116), one having ordinary skill in the relevant art, and the benefit of this Detailed Description will appreciate that the system may include any number of storage devices, which the three dots between the storage device A 114 and the storage device N 116 is intended to convey. All or any portion of the storage devices may be the same type, or different types of storage devices.

In one or more embodiments, the underlying storage for the planar file system is optionally a parallel file system 118, as indicated by the dashed line of the parallel file system 118 shown in FIG. 1. In one or more embodiments, the parallel file system 118 is a file system in which file data is striped across any number of homogeneous or heterogeneous storage devices, and that may be concurrently accessed by any number of entities (e.g., computing devices). In one or more embodiments, when the planar file system manager 112 uses the parallel file system 118 as the underlying storage mechanism for the planar file system, the planes defined by the user may be striped across the various storage devices in a similar manner, while also gaining the benefits provided by parallel file systems. The planar file system manager 112 may include and/or be operatively connected to a parallel file system manager (not shown), and operate in conjunction with the parallel system file manager to implement a planar file system on the parallel file system. Any other storage solution types (e.g., network file systems, distributed file systems, etc.) may be used without departing from the scope of embodiments disclosed herein. A planar file system may be implemented as a logical construct, regardless of the underlying storage technologies used to store the files of the planar file system. Additionally, or alternatively, a planar file system may be used as part of a technique for formatting storage devices (e.g., flash storage devices), with the organization of the formatting being based, at least in part, on the user-defined planes and plane relationships, which may be referred to as relationship configurable planar formatting. In one or more embodiments, a planar formats' relationships can be made reconfigurable anytime for modifying the relationships of the data sets in the context of such formats, which may be done, for example, where the amount of stored data is in order of petabytes or of similar magnitude, and/or when an HPC application and/or a big data set is being stored While FIG. 1 shows a particular configuration of components, other configurations may be used without departing from the scope of embodiments described herein. For example, although FIG. 1 shows certain components as part of the same device, any of the components may be grouped in sets of one or more components which may exist and execute as part of any number of separate and operatively connected devices. As another example, a single component may be configured to perform all, or any portion of the functionality performed by the all or any portion of the components shown in FIG. 1. Accordingly, embodiments disclosed herein should not be limited to the configuration of components shown in FIG. 1.

Figure 2:
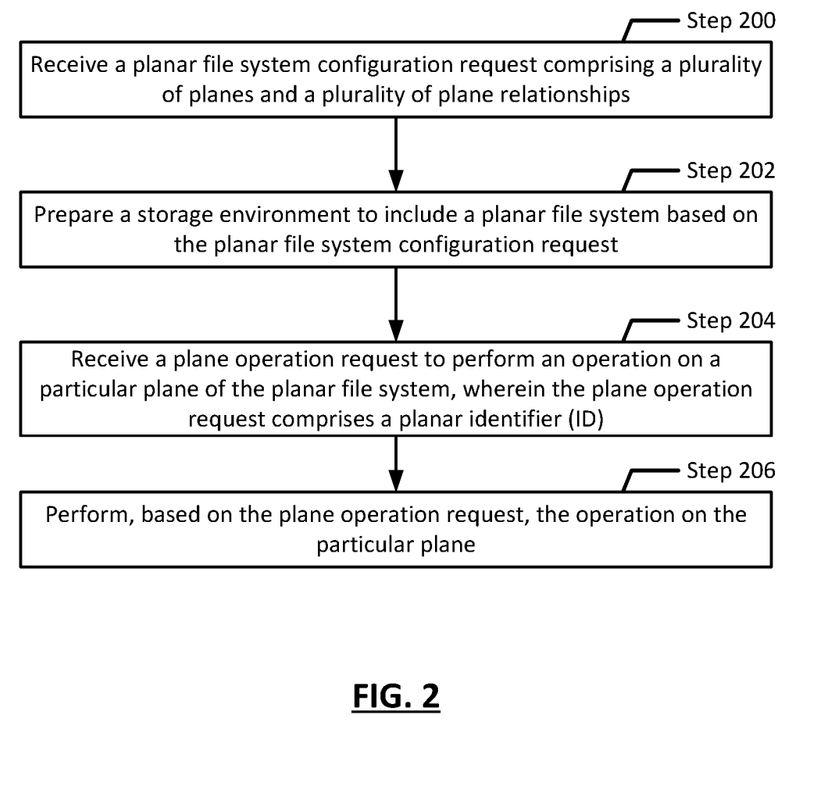
FIG. 2 illustrates an overview of an example method for implementing a planar file system in accordance with one or more embodiments disclosed herein.

FIG. 2 illustrates an overview of an example method for implementing a planar file system in accordance with one or more embodiments disclosed herein. The method may be performed, at least in part, by a planar file system manager (e.g., the planar file system manager 112 shown in FIG. 1).

While the various steps in the flowchart shown in FIG. 2 are presented and described sequentially, some or all of the steps may be executed in different orders, some or all of the steps may be combined or omitted, and some or all of the steps may be executed in parallel with other steps of FIG. 2.

In Step 200, the method includes receiving a planar file system configuration request comprising a plurality of planes and a plurality of plane relationships. As an example, the planar file system configuration request may be received at a planar file system manager (e.g., the planar file system manager 112 of FIG. 1). In one or more embodiments, the planar file system configuration request is received from a user seeking to configure a planar file system for storing large quantities of files. As an example, an administrator working on a high performance computing application may seek to configure a planar file system to store data to be analyzed by the high performance computing application.

A planar file system configuration request may include a request for any number of planes (e.g., tens, hundreds, etc.). In one or more embodiments, the planar file system configuration request includes a definition of relationships between the planes to be configured. As an example, the planar file system configuration request may specify that some portion of the planes are to be related in any number of nested plane relationships, that planes have any number of sub-planes, that some planes are orthogonally related to one another, etc. The planar file system configuration request may specify any other relevant information for configuring a storage file system without departing from the scope of embodiments disclosed herein. Examples of other relevant information include, but are not limited to, the sizes of the planes and sub-planes, maximum and/or minimum file sized to be allowed in the planes, security parameters for the planes, access permissions for the planes, encryption requirements for the planes, data retention policies for the planes, etc.

The planar file system configuration request may be received via any technique for a user to interact with a planar system file manager. As an example, a user may access a user interface of the planar system file manager over a network connection.

In Step 202, the method includes preparing a storage environment to include a planar file system based on the planar file system configuration request. In one or more embodiments, a planar file system manager (e.g., the planar file system manager 112 of FIG. 1) may prepare a storage environment to include a planar file system. In one or more embodiments, preparing the storage environment includes formatting any number of storage devices to be configured to store the planes (which may be referred to as planar formatting or formats), and, ultimately, any files to be stored in the planes. In one or more embodiments, preparing the storage environment includes instantiating any number of data structures for mapping the organization of the planar file system and/or for performing lookups of files, planes, sub-planes, etc. included in the planar file system. In one or more embodiments, preparing the storage environment includes using or otherwise interacting with an underlying storage technology on which the planar file system is to be deployed.

As an example, the planar file system may be implemented using parallel file system technology, and the planar file system manager may interact with a parallel file system management entity to implement the planar file system on an underlying parallel file system by, for example, striping the planes across any number of homogeneous and/or heterogeneous storage devices. Similarly planar deduplication, planar redundancy, planar indexed metadata management with respect to storage backup, restore operations, logical volumes, etc. may be performed in the context of a planar file system's planes and sub-planes Thus, the planes, as implemented on a parallel file system may be accessible to any number of computing devices that may need to repetitively access the data to perform various operations and analysis (e.g., climate modelling (e.g., for weather science study), atomic/subatomic level models, AI enabled models in financial domains, cyber security, scientific computing, etc.).

As another example, a planar file system may be implemented using physical volumes, logical volumes, and volume groups. In one or more embodiments, a volume group is a collection of one or more physical devices, in which each device is called a physical volume. In one or more embodiments, a logical volume is a virtual block device that can be used by a system or by applications. In one or more embodiments, by installing a single plane planar file system in each logical volume in a volume group, relationship established planar/sub planar logical volumes can be created. For example, logical volumes may be created from physical disk volumes (e.g., hdisk1, 2, 3). In such logical volumes, filesystems (e.g., jfs, ext3, jfs2) could be installed, respectively. Instead, as an example, in a set of three logical volumes (e.g., 1, 2, and 3), a planar file system may be installed, and a data set oriented relationship (e.g., orthogonal or logical super set: sub set) may be established between the logical volumes. In one or more embodiments, the relationship established planar logical volume groups may be created when planar file system based planar formatting is used in the logical volume groups. In one or more embodiments, the logical volume manager maintains the planar IDs corresponding to the logical volumes and corresponding relationships. In one or more embodiments, when such logical volumes have other file systems like jfs, ext3, etc., a relationship may not be established through filesystem techniques, among the different logical volumes (and data included in the different logical volumes).

In one or more embodiments, preparing the storage environment may include performing planar mounting. In one or more embodiments, planar mounting include mounting an entire planar file system, or any portion thereof (e.g., only a subset of the planes, sub-planes, etc. of the planar file system). Generally, for non-planar file systems, when a storage device is installed that includes a file system (e.g., a USB flash drive with a new technology file system (NTFS)), the entire file system is mounted at a mount point in an operating system. For example, in a Linux operating system, such a file system may be mounted using a mount command 'mount/dev/sda1/mnt/media1', which mounts the file system on the USB flash drive to the /mnt/media1 directory. Thus, by accessing /mnt/media1, a user may access all of the directories and files in the file system of the USB flash drive. In one or more embodiments, if a storage device (e.g., a USB flash drive) instead is formatted to include a planar file system, possibly with multiple planar formats, then through the planar file system provisions, differential planar mounting may be performed. Differential planar mounting may be used when only part of the file system is to be mounted. As an example, a command to mount only part of a planar file system may be as follows: mount /sda2/mnt/media1 {<optional planar IDs>}. In such an example, if the storage device indicated by /dev/sda2 includes a planar file system, then a user has an option to mount the entire planar file system, or only a subset of the planes therein. Thus, in one or more embodiments, different planes of a planar system may be treated differently for mounting purposes. As an example, planar security may be enforced, such that some planes may only be mounted with the use of a password, or multi-factor authentication, while other planes may be designated as default planes that may be mounted without any security.

In Step 204, the method includes receiving a plane operation request to perform an operation on a particular plane of the planar file system. In one or more embodiments, the plane operation request comprises a planar ID. In one or more embodiments, the plane operation request is received by a planar file system manager (e.g., the planar file system manager 112 of FIG. 1). A plane operation request may be a request to perform any one or more operations of any type on any one or more planes or sub-planes of a planar file system. Examples include, but are not limited to: accessing the one or more files stored in a plane or sub-plane (e.g., for performing an analysis of the data of the files); adding, modifying, deleting, etc. attributes, characteristics, configuration parameters, etc. of a plane (e.g., access permissions, security parameters, retention policies, encryption policies, backup policies, etc.); adding, deleting, or modifying planes; adding, deleting, or modifying plane relationships, etc.

In Step 206, the method includes performing, based on the plane operation request, the operation requested on one or more particular planes of the planar file system. As an example, a planar file system manager (e.g., the planar file system manager 112 of FIG. 1) may perform the operation. As an example, the plane operation request may be a request to access all of the files (e.g., millions of files) in a plane to use as input to a machine learning algorithm configured to produce one or more output results. Such a request may be simplified, via embodiments disclosed herein, by the request merely needing to specify the planar ID for the plane, rather than information about the specific files therein, which allows the planar file system manager to use the planar ID to perform a lookup to obtain the files of the plane. In one or more embodiments, the operation may be a storage operation. Storage operations may include, but is not limited to, backup operations, replication operations, deduplication operations, and/or disaster recovery operations (e.g., fail over, fail back, restore, etc.), which may be performed at planar or sub-planar or sub-planar granularity data sets (e.g., for planes and/or sub-planes).

Figure 3:
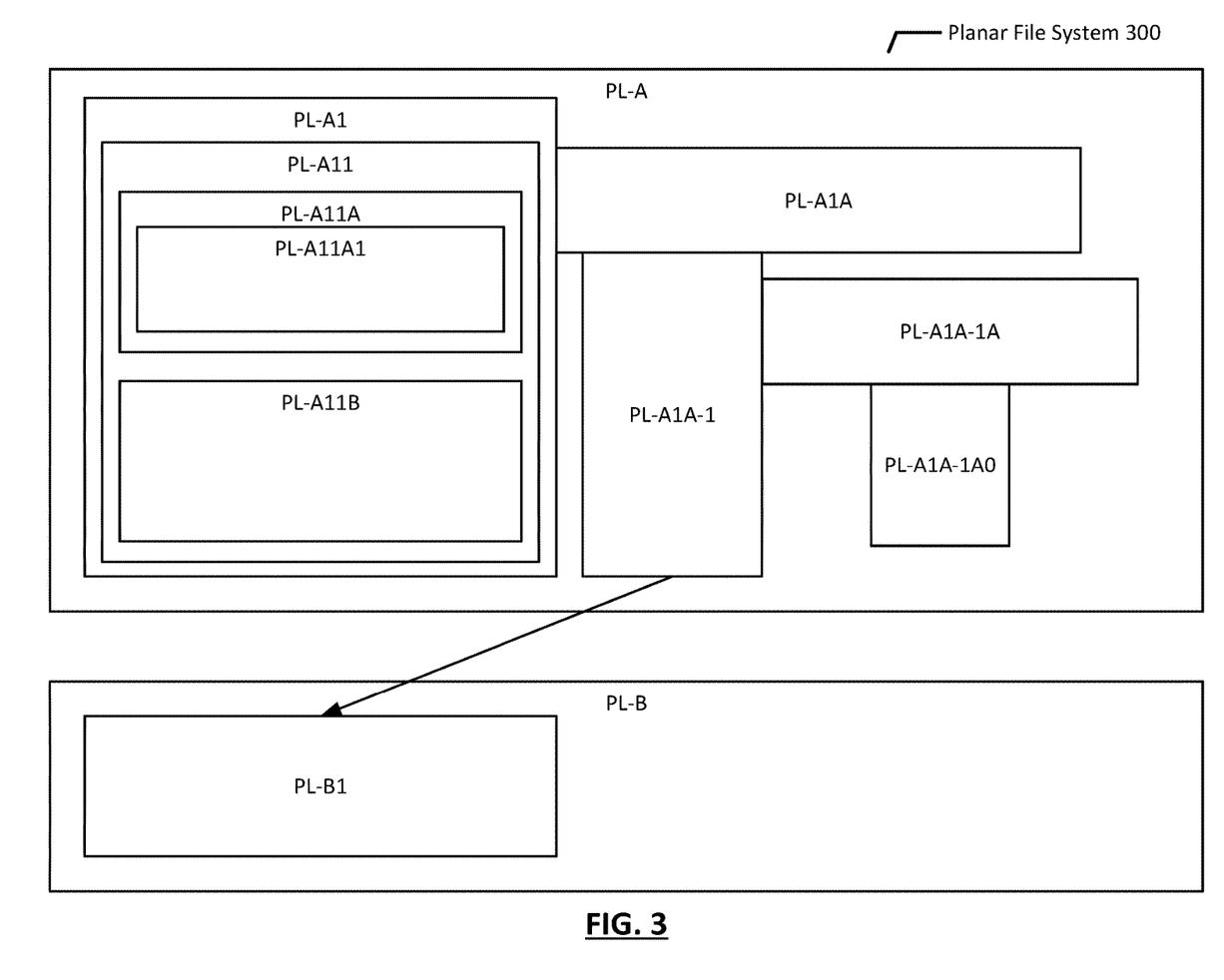
FIG. 3 illustrates an example planar file system 300, in accordance with one or more embodiments of this disclosure.

FIG. 3 illustrates an example planar file system 300, in accordance with one or more embodiments of this disclosure. The example shown in FIG. 3 and discussed below is a simplified example intended for explanatory purposes only, and not intended to limit the scope of embodiments described herein. Additionally, while the example shows certain aspects of embodiments described herein, all possible aspects of such embodiments may not be illustrated in this particular example.

FIG. 3 shows an example planar file system 300. The view of the planar file system 300 shown in FIG. 3 may be a logical view representing relationships between the planes of the planar file system 300, such as when the planes are actually stripped across any number of storage devices of a parallel file system. Additionally, or alternatively, the view of the planar file system 300 shown in FIG. 3 may represent a physical view of the layout of the planes therein as formatted on one or more storage devices.

The example planar file system 300 includes at the highest level two planes, PL-A and PL-B, which are the planar IDs for the two planes. The other planes and sub-planes described as part of this example will have planar IDs following a similar naming convention as defined by a user, who also specified the relationships between the planes (described below). The structure of the planar file system shown in FIG. 3 may have been configured and implemented for the user by a planar file system manager (e.g., the planar file system manager 112 of FIG. 1)

PL-A includes a nested sub-plane PL-A1, which includes two nested sub-planes PL-A11A and PL-A11B. Plane PL-A11A includes a further nested sub-plane PL-A11A1. Thus, files in PL-A11A1 may have a sub-planar relationship to the files of PL-A11A, which may have a sub-planar relationship to the files of PL-A11, which may have a sub-planar relationship to the files of PL-A1, which may have a sub-planar relationship to the files of PL-A. The files of PL-A11B may have a sub-planar relationship relative to the files of the files of PL-A11, but otherwise be discrete from the files of PL-A11A and its nested sub-planes.

Plane PL-A may also include a sub-plane PL-A1A. PL-A1A has an orthogonal relationship to PL-A1, meaning that the files therein are logically related to one another in some way, but that the files stored in PI-A1A are not a sub-planar of the files of PL-A1.

Plane PL-A may also include a sub-plane PL-A1A-1. PL-A1A-1 has an orthogonal relationship to PL-A1A, meaning that the files therein are logically related to one another in some way, but that the files stored in PI-A1A-1 are not a sub-planar of the files of PL-A1A.

Plane PL-A may also include a sub-plane PL-A1A-1A. PL-A1A-1A has an orthogonal relationship to PL-A1A-1, meaning that the files therein are logically related to one another in some way, but that the files stored in PI-A1A-1A are not a sub-planar of the files of PL-A1A-1.

Plane PL-A may also include a sub-plane PL-A1A-1A0. PL-A1A-1A0 has an orthogonal relationship to PL-A1A-1A, meaning that the files therein are logically related to one another in some way, but that the files stored in PI-A1A-1A0 are not a sub-planar of the files of PL-A1A-1A.

Plane PL-B may include a sub-plane PI-B1. The files sub-plane PL-B1 may have an orthogonal relationship with the files of the sub-plane PL-A1A-1, as shown in FIG. 3.

Figure 4:
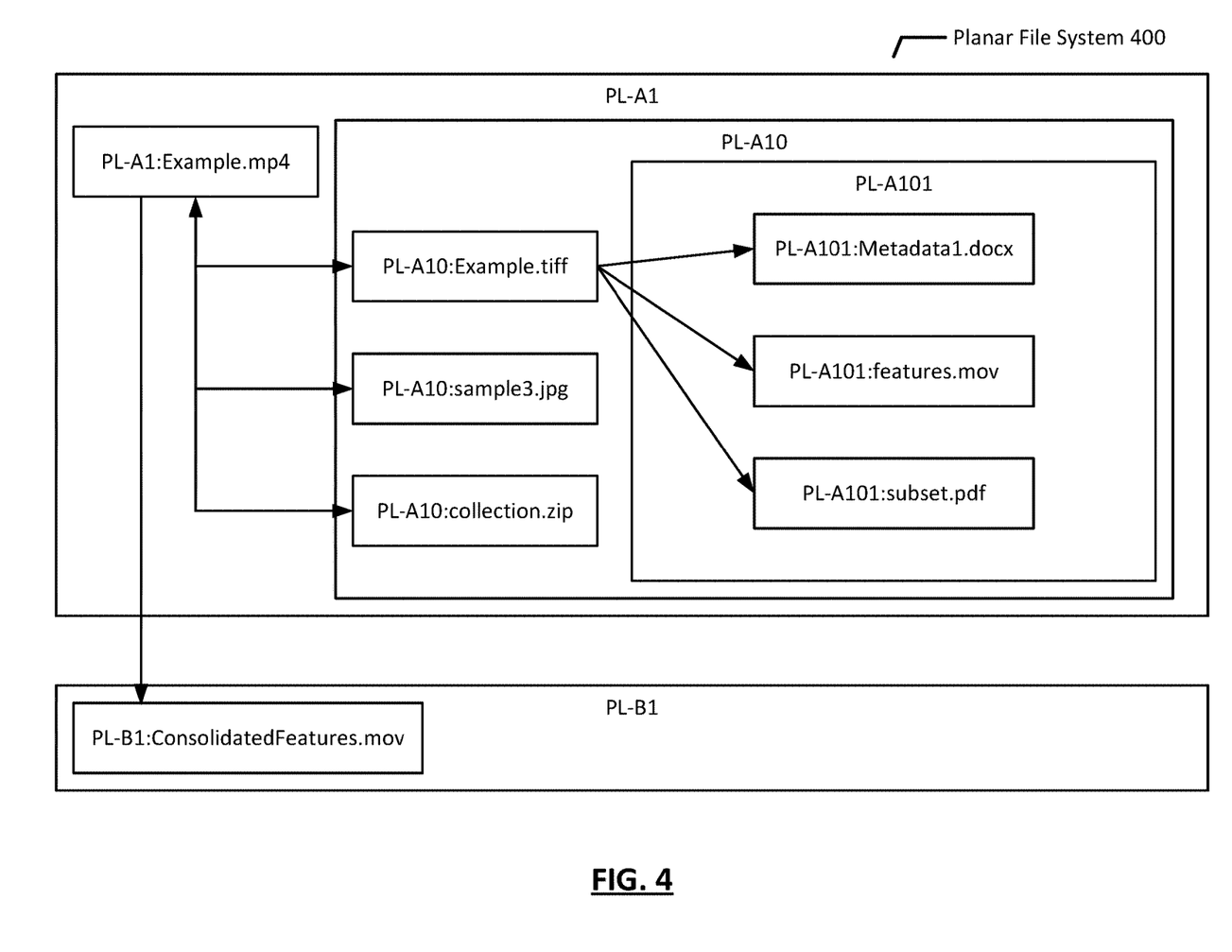
FIG. 4 illustrates an example planar file system 400 that includes example files, in accordance with one or more embodiments of this disclosure.

FIG. 4 illustrates an example planar file system 400 that includes example files, in accordance with one or more embodiments of this disclosure. The example shown in FIG. 4 and discussed below is a simplified example intended for explanatory purposes only, and not intended to limit the scope of embodiments described herein. Additionally, while the example shows certain aspects of embodiments described herein, all possible aspects of such embodiments may not be illustrated in this particular example.

Consider a scenario in which a user has interacted with a planar file system manager to configure a planar file system implemented using an underlying parallel file system, such that the data stored in the planes is stored in a stripped manner across any number of underlying heterogeneous storage devices. The user intends to use the planar file system to store any number of audio/video files, and other files related thereto, that may later be accessed in order to be analyzed for some purpose.

The planar file system manager, based on the user's planar file system configuration request, may logically configure the parallel file system to include the plane layout shown in FIG. 4, which includes two planes PL-A1 and PL-B1 (e.g., the planar IDs), with PL-A1 having a sub-plane PL-A10, which has a sub-plane PL-A101. The user, in the planar file system configuration request, specified the nested sub-planar relationships between PL-A1, PL-A10, and PL-A101, as well as an orthogonal relationship between PI-A1 and PL-B1.

The user may then begin storing files in the planar file system 400, and the files will have relationships based on the plane in which they are stored. The user may store the file Example.mp4 in the plane PL-A1 by providing a plane operation request for storing the file to the planar file system manager that includes the planar ID: file handle combination PL-A1: Example.mp4. Similarly, the user may store the file PL-B1: ConsolidatedFeature.mov in PL-B1, the files PL-A10: Example.tiff, PL-A10: sample3.jpg, and PL-A10: collection.zip in PL-A10, as well as the files PL-A101: metadata1.docx, PL-A101: features.mov, and PL-A101: subset.pdf in PL-A101.

By virtue of the planes in which they are stored, the files PL-A101: metadata1.docx, PL-A101: features.mov, and PL-A101: subset.pdf in PL-A101 each have a sub-planar relationship to PL-A10: Example.tiff, and the files PL-A10: Example.tiff, PL-A10: sample3.jpg, and PL-A10: collection.zip have a sub-planar relationship with PL-A1: Example.mp4. Additionally, PL-A1: Example.mp4 has an orthogonal relationship with PL-B1: ConsolidatedFeature.mov, as it is stored in PL-B1.

FIG. 5A shows an example planar file system lookup table 500 in accordance with one or more embodiments disclosed herein. The table 500 represents the files shown as stored in the planar file system 400 of FIG. 4, including the planar ID, file handle, file size, and plane relationship level for each file. Thus, when a plane operation request is received at a planar file system manager, the planar file system manager may access individual files (e.g., when the plane operation request includes the planar ID and file handle), file groups in a plane (e.g., when the plane operation request includes a planar ID), or files that have some sort of relationship, as represented in table 500 (e.g., the orthogonal relationship between PL-A1 and PL-B1).

FIG. 5B shows an example of a planar file system lookup DAG 550. The DAG 550 may be organized as shown based on planar IDs, and may be used for performing lookups in planar file systems, similar to the lookups discussed above in the description of FIG. 5A.

Figure 6:
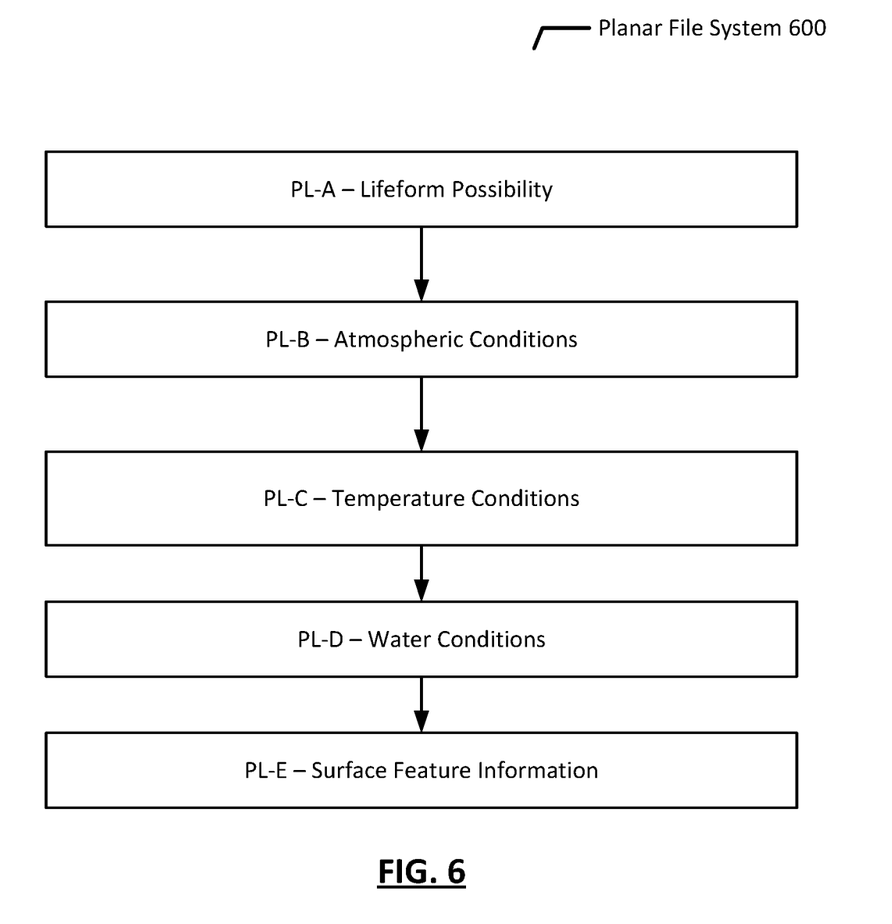
FIG. 6 illustrates an example planar file system 600 that includes orthogonal relationships between planes, in accordance with one or more embodiments of this disclosure.

FIG. 6 illustrates an example planar file system 600 that includes orthogonal relationships between planes, in accordance with one or more embodiments of this disclosure. The example shown in FIG. 6 and discussed below is a simplified example intended for explanatory purposes only, and not intended to limit the scope of embodiments described herein. Additionally, while the example shows certain aspects of embodiments described herein, all possible aspects of such embodiments may not be illustrated in this particular example.

Consider a scenario in which a research organization investigates the possibility of life on other planets. Any number of probes have been sent out in any number of directions, and periodically send back files with various sensor readings taken over time. As the probes travel for years, decades, etc. there may be an immense number of files. In order to organize the files for analysis, a user at the research organization interacted with a planar file system manager to implement a planar file system. The user specifies that the planar file system is to include five planes, PI-A, PL-B, PL-C, PL-D, and PL-E, that the planes are orthogonally related in that order, and that any number of files may be stored in each plane. The research organization has a high performance computing (HPC) solution that is to access the planar file system to perform a series of analyses as part of the search for life.

The first plane, PL-A, includes high-level data about the possibility of lifeforms in various galaxies. The second plane, PL-B includes files related to atmospheric conditions on planets in galaxies. The third plane, PL-C includes files related to temperature conditions on planets. The fourth plane, PL-D, includes files related to water conditions on planets. The fifth plane, PL-E, includes files related to surface feature information of planets.

The orthogonal relationships between the five planes, as shown by arrows in FIG. 6, are configured by the user in order to inform the flow of analysis by the HPC solution of the research organization. Accordingly, the analysis is first performed using files in PL-A to determine if one or more probes sending data are within a portion of the universe where life may be possible. If the analysis yields a yes, then the analysis may move on to the orthogonally related PL-B to analyze atmospheric conditions of planets in that portion of the universe to determine if they are conducive to life (e.g., the atmosphere of a planet includes an ozone). If that analysis yields a yes, then the analysis may move on to the orthogonally related PL-C to analyze whether temperature conditions on the planets are conducive to life. If that analysis yields a yes, then the analysis may continue to the orthogonally related PL-D to analyze whether water exists in sufficient amounts on the planets to support lifeforms. If that analysis yields a yes, then the analysis may continue to the orthogonally related PL-E to analyze whether the surface features of the planets (e.g., quantity of volcanoes, seismic activity, etc.) are within a range conducive to supporting lifeforms. Thus, the search for life on distant planets, which involves analysis of large numbers of related files, is improved by being able to perform the analysis using a planar file system of orthogonally related planes, each including related data. Though not shown in FIG. 6, taking PL-B as an example, there may be several sub planes that are discrete subsets or orthogonally related, and that may have inferences/analysis related to the aforementioned problems, stored as files. Such an example (e.g., of the additional several sub planes that are discrete subsets or orthogonally related) may applicable within each plane (e.g., PL-A, PL-B, PL-C, PL-D, PL-E.

Figure 7:
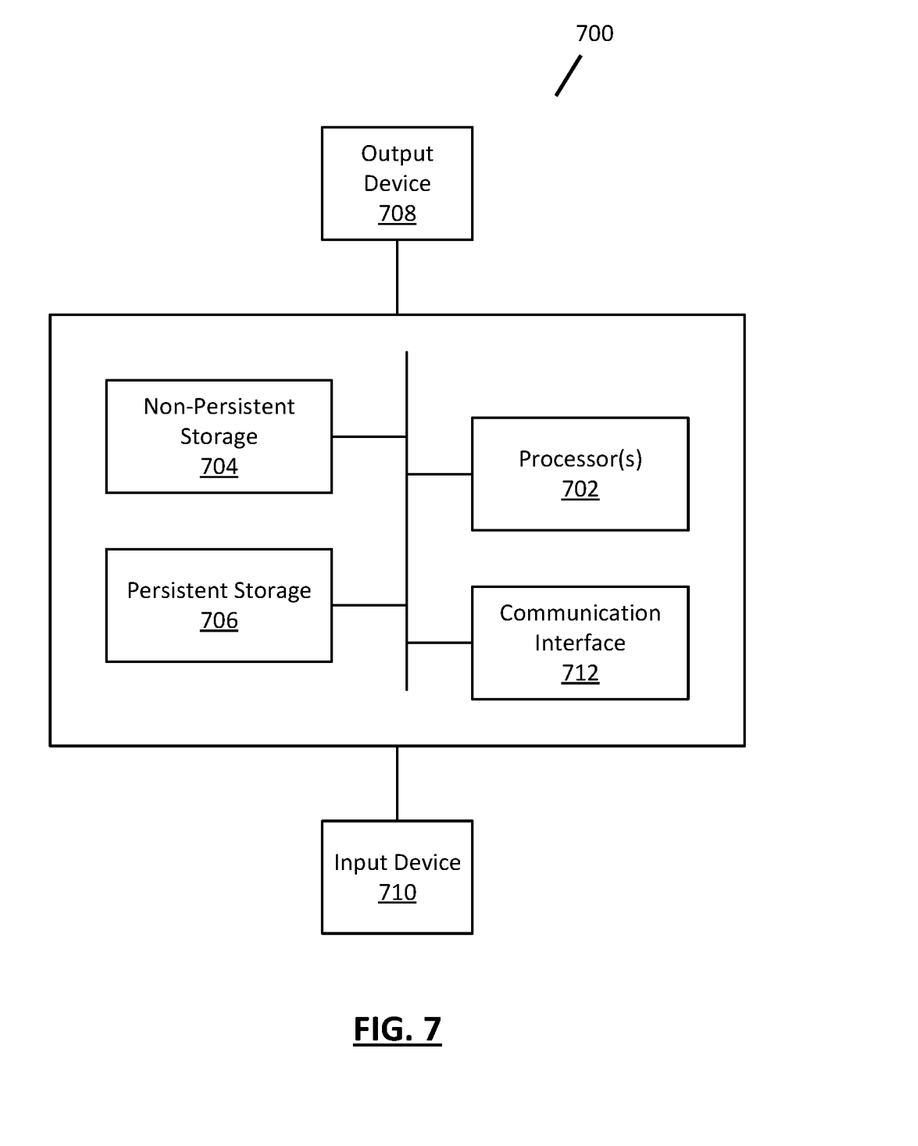
FIG. 7 illustrates a block diagram of a computing device, in accordance with one or more embodiments of this disclosure.

FIG. 7 illustrates a block diagram of a computing device, in accordance with one or more embodiments of this disclosure. As discussed above, embodiments described herein may be implemented using computing devices. For example, the all or any portion of the components shown in FIG. 1 may be implemented, at least in part, using one or more computing devices. The computing device 700 may include one or more computer processors 702, non-persistent storage 704 (e.g., volatile memory, such as random access memory (RAM), cache memory, etc.), persistent storage 706 (e.g., a hard disk, an optical drive such as a compact disk (CD) drive or digital versatile disk (DVD) drive, a flash memory, etc.), a communication interface 712 (e.g., Bluetooth interface, infrared interface, network interface, optical interface, etc.), input devices 710, output devices 708, and numerous other elements (not shown) and functionalities. Each of these components is described below.

In one or more embodiments, the computer processor(s) 702 may be an integrated circuit for processing instructions. For example, the computer processor(s) may be one or more cores or micro-cores of a processor. The processor 702 may be a general-purpose processor configured to execute program code included in software executing on the computing device 700. The processor 702 may be a special purpose processor where certain instructions are incorporated into the processor design. Although only one processor 702 is shown in FIG. 7, the computing device 700 may include any number of processors without departing from the scope of embodiments disclosed herein.

The computing device 700 may also include one or more input devices 710, such as a touchscreen, keyboard, mouse, microphone, touchpad, electronic pen, motion sensor, or any other type of input device. The input devices 710 may allow a user to interact with the computing device 700. In one or more embodiments, the computing device 700 may include one or more output devices 708, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 702, non-persistent storage 704, and persistent storage 706. Many different types of computing devices exist, and the aforementioned input and output device(s) may take other forms. In some instances, multimodal systems can allow a user to provide multiple types of input/output to communicate with the computing device 700.

Further, the communication interface 712 may facilitate connecting the computing device 700 to a network (not shown) (e.g., a local area network (LAN), a wide area network (WAN) such as the Internet, mobile network, or any other type of network) and/or to another device, such as another computing device. The communication interface 712 may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 712 may also include one or more Global Navigation Satellite System (GNSS) receivers or transceivers that are used to determine a location of the computing device 700 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of the computing device 700 may be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples of embodiments described herein. It will be understood by those skilled in the art (who also have the benefit of this disclosure) that one or more embodiments described herein may be practiced without these specific details, and that numerous variations or modifications may be possible without departing from the scope of the embodiments described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various embodiments described herein, may be equivalent to one or more same or similarly named and/or numbered components described with regard to any other figure. For brevity, descriptions of these components may not be repeated with regard to each figure. Thus, each and every embodiment of the components of each figure is incorporated by reference and assumed to be optionally present within every other figure having one or more same or similarly named and/or numbered components. Additionally, in accordance with various embodiments described herein, any description of the components of a figure is to be interpreted as an optional embodiment, which may be implemented in addition to, in conjunction with, or in place of the embodiments described with regard to a corresponding one or more same or similarly named and/or numbered component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments discussed herein have been described with respect to a limited number of embodiments, those skilled in the art, having the benefit of this disclosure, will appreciate that other embodiments can be devised which do not depart from the scope of embodiments as disclosed herein. Accordingly, the scope of embodiments described herein should be limited only by the attached claims.

What is claimed is:

1. An apparatus, comprising:
one or more processors; and
one or more non-transitory computer readable media storing instructions which, when executed by the one or more processors, cause the one or more processors to:
receive, from a user interface and at a planar file system manager executing on the one or more processors, a planar file system configuration request comprising a plurality of planes, a plurality of sub-planes, and a plurality of plane relationships, wherein:
the plurality of plane relationships comprise a subplanar relationship between a plane and a first sub-plane, a first orthogonal relationship between two separate planes of the plurality of planes, and a second orthogonal relationship between a second sub-plane of the plurality of sub-planes and a third sub-plane of the plurality of sub-planes, and
the second sub-plane and the third sub-plane are sub-planes of different planes;
configure, by the planar file system manager, a storage environment to include a planar file system based on the planar file system configuration request, wherein configuring the storage environment to include the planar file system comprises formatting a plurality of storage devices to include the plurality of planes and the plurality of sub-planes;
receive, from the user interface, a plane operation request to perform an operation on a first plane of the plurality of planes of the planar file system, wherein the plane operation request comprises a planar identifier corresponding to the plane;

perform, based on the plane operation request, the operation on the first plane to obtain an initial analysis result; and perform, based on the initial analysis result, an additional plane operation on a second plane of the plurality of planes of the planar file system that is related to the first plane by the first orthogonal relationship, wherein the additional plane operation is performed on the second plane based at least in part on the first orthogonal relationship.

2. The apparatus of claim 1, wherein the storage environment comprises a parallel file system.

3. The apparatus of claim 2, wherein the plurality of planes are stripped across the plurality of storage devices of the parallel file system.

4. The apparatus of claim 2, wherein the operation performed based on the plane operation request comprises invoking one or more planar locks to facilitate concurrent access to one or more of the plurality of planes for a plurality of computing devices.

5. The apparatus of claim 1, wherein the operation performed based on the plane operation request is performed, at least in part, using a planar file system lookup directed acyclic graph (DAG).

6. The apparatus of claim 1, wherein the operation performed based on the plane operation request comprises a modification of an attribute of the first plane that is applied to sub-planes of the first plane.

7. The apparatus of claim 1, wherein the operation performed based on the plane operation request is a storage operation.

8. A computer-implemented method, comprising:
receiving, from a user interface and at a planar file system manager executing on one or more processors, a planar file system configuration request comprising a plurality of planes, a plurality of sub-planes, and a plurality of plane relationships, wherein:
the plurality of plane relationships comprise a sub-planar relationship between a plane and a first sub-plane, a first orthogonal relationship between two separate planes of the plurality of planes, and a second orthogonal relationship between a second sub-plane of the plurality of sub-planes and a third sub-plane of the plurality of sub-planes, and
the second sub-plane and the third sub-plane are sub-planes of different planes;
configuring, by the planar file system manager, a storage environment to include a planar file system based on the planar file system configuration request, wherein configuring the storage environment to include the planar file system comprises formatting a plurality of storage devices to include the plurality of planes and the plurality of sub-planes;
receiving, from the user interface, a plane operation request to perform an operation on a first plane of the plurality of planes of the planar file system, wherein the plane operation request comprises a plane identifier corresponding to the plane;
performing, based on the plane operation request, the operation on the first plane to obtain an initial analysis result; and
performing, based on the initial analysis result, an additional plane operation on a second plane of the plurality of planes of the planar file system that is related to the first plane by the first orthogonal relationship, wherein the additional plane operation is performed on the second plane based at least in part on the first orthogonal relationship.

9. The computer-implemented method of claim 8, wherein the storage environment comprises a parallel file system.

10. The computer-implemented method of claim 9, wherein the plurality of planes are stripped across the plurality of storage devices of the parallel file system.

11. The computer-implemented method of claim 8, wherein the operation performed based on the plane operation request is performed, at least in part, using a planar file system lookup data structure.

12. The computer-implemented method of claim 8, wherein the operation performed based on the plane operation request comprises a modification of an attribute of the first plane that is applied to sub-planes of the first plane.

13. The computer-implemented method of claim 8, wherein the operation performed based on the plane operation request comprises a modification of an attribute of a sub-plane of the plane, and wherein the modification is not applied to the plane.

14. A non-transitory computer-readable medium storing programming for execution by one or more processors, the programming comprising instructions to:
receive, from a user interface and at a planar file system manager executing on the one or more processors, a planar file system configuration request comprising a plurality of planes, a plurality of sub-planes, and a plurality of plane relationships, wherein:
the plurality of plane relationships comprise a sub-planar relationship between a plane and a first sub-plane, a first orthogonal relationship between two separate planes of the plurality of planes, and a second orthogonal relationship between a second sub-plane of the plurality of sub-planes and a third sub-plane of the plurality of sub-planes, and
the second sub-plane and the third sub-plane are sub-planes of different planes;
configure, by the planar file system manager, a storage environment to include a planar file system based on the planar file system configuration request, wherein configuring the storage environment to include the planar file system comprises formatting a plurality of storage devices to include the plurality of planes and the plurality of sub-planes;
receive, from the user interface, a plane operation request to perform an operation on a first plane of the plurality of planes of the planar file system, wherein the plane operation request comprises a plane identifier corresponding to the plane;
perform, based on the plane operation request, the operation on the first plane to obtain an initial analysis result; and
perform, based on the initial analysis result, an additional plane operation on a second plane of the plurality of planes of the planar file system that is related to the first plane by the first orthogonal relationship, wherein the additional plane operation is performed on the second plane based at least in part on the first orthogonal relationship.

15. The non-transitory computer-readable medium of claim 14, wherein the storage environment comprises a parallel file system, and wherein the plurality of planes are stripped across the plurality of storage devices of the parallel file system.

16. The non-transitory computer-readable medium of claim 14, wherein the operation performed based on the plane operation request is performed, at least in part, using a planar file system lookup data structure.

17. The non-transitory computer-readable medium of claim 14, wherein the operation performed based on the plane operation request comprises a modification of an attribute of the first plane that is applied to sub-planes of the first plane.

18. The non-transitory computer-readable medium of claim 14, wherein the operation performed based on the plane operation request is a modification of an attribute of a sub-plane of the plane, and wherein the operation is not applied to the plane.

19. The non-transitory computer-readable medium of claim 14, wherein to configure the storage environment, the non-transitory computer-readable medium comprises further instructions to format one or more storage devices to include the planar file system.

\* \* \* \* \*